US009821463B2

(12) United States Patent
Kuffner, Jr. et al.

(10) Patent No.: US 9,821,463 B2
(45) Date of Patent: Nov. 21, 2017

(54) VIRTUAL SAFETY CAGES FOR ROBOTIC DEVICES

(71) Applicant: X Development LLC, Mountain View, CA (US)

(72) Inventors: James J. Kuffner, Jr., Sunnyvale, CA (US); Peter Elving Anderson-Sprecher, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/340,656

(22) Filed: Nov. 1, 2016

(65) Prior Publication Data

US 2017/0043484 A1 Feb. 16, 2017

Related U.S. Application Data

(63) Continuation of application No. 15/005,362, filed on Jan. 25, 2016, now Pat. No. 9,522,471, which is a (Continued)

(51) Int. Cl.
*B25J 9/00* (2006.01)
*B25J 9/16* (2006.01)
*B25J 19/06* (2006.01)

(52) U.S. Cl.
CPC ............ *B25J 9/1676* (2013.01); *B25J 19/06* (2013.01); *G05B 2219/40196* (2013.01); (Continued)

(58) Field of Classification Search
CPC combination set(s) only.
See application file for complete search history.

(56) References Cited

U.S. PATENT DOCUMENTS 4,933,864 A * 6/1990 Evans, Jr. ............... G01S 5/16
180/167
5,548,694 A * 8/1996 Gibson ................... G06T 15/10
345/424
(Continued)

FOREIGN PATENT DOCUMENTS

EP      1516704 A2    3/2005
EP      2380709 A2   10/2011
JP    2012-218120 A  11/2012

OTHER PUBLICATIONS

International Search Report and Written Opinion of International Application No. PCT/US2015/030265 dated Sep. 22, 2015 (dated Oct. 1, 2015).

(Continued)

*Primary Examiner* — Jonathan L Sample
(74) *Attorney, Agent, or Firm* — McDonnell Boehnen Hulbert & Berghoff LLP

(57) ABSTRACT

Methods and systems for determining and presenting virtual safety cages are provided. An example method may involve receiving an instruction for a robotic device to perform a physical action in a physical environment occupied by the robotic device. The method may also involve, responsive to receiving the instruction, and based on one or more parameters of one or more physical components of the robotic device, determining one or more estimated trajectories along which the one or more physical components of the robotic device are estimated to move as the robotic device performs the physical action. The method may further involve, based on the one or more estimated trajectories, determining a virtual representation of a space that the robotic device is estimated to occupy in the physical environment while performing the physical action. The method may then involve providing, into the physical environment, an indication of a location of the space.

20 Claims, 9 Drawing Sheets

Related U.S. Application Data continuation of application No. 14/333,173, filed on Jul. 16, 2014, now Pat. No. 9,283,678.

(52) U.S. Cl.
CPC .............. *G05B 2219/40202* (2013.01); *G05B 2219/40203* (2013.01); *Y10S 901/47* (2013.01); *Y10S 901/49* (2013.01)

(56) References Cited

U.S. PATENT DOCUMENTS

| | | | | |
|---|---|---|---|---|
| 5,835,684 A * | 11/1998 | Bourne | ............... | B25J 9/1666 700/255 |
| 6,212,443 B1 * | 4/2001 | Nagata | ............... | G05B 19/423 318/568.13 |
| 7,298,385 B2 * | 11/2007 | Kazi | ............... | B25J 9/1671 345/633 |
| 7,447,593 B2 * | 11/2008 | Estkowski | ............... | G01C 21/20 700/250 |
| 7,627,394 B2 * | 12/2009 | Volcic | ............... | B25J 9/1664 318/567 |
| 7,769,491 B2 * | 8/2010 | Fukuchi | ............... | G05D 1/0251 382/106 |
| 7,873,438 B2 * | 1/2011 | Sekiya | ............... | B25J 19/023 700/245 |
| 8,019,475 B2 * | 9/2011 | Kuroda | ............... | G05D 1/0214 700/245 |
| 8,036,775 B2 * | 10/2011 | Matsumoto | ............... | G05D 1/024 700/245 |
| 8,315,738 B2 * | 11/2012 | Chang | ............... | B25J 9/1666 700/248 |
| 8,355,818 B2 * | 1/2013 | Nielsen | ............... | G05D 1/0088 340/628 |
| 8,718,837 B2 * | 5/2014 | Wang | ............... | B25J 9/1689 382/209 |
| 8,843,234 B2 * | 9/2014 | Tao | ............... | B25J 9/1674 700/245 |
| 8,849,452 B2 * | 9/2014 | Takeda | ............... | B62D 57/032 318/567 |
| 8,930,023 B2 * | 1/2015 | Gutmann | ............... | G05D 1/0234 700/245 |
| 2003/0225479 A1 * | 12/2003 | Waled | ............... | B25J 9/161 700/245 |
| 2004/0267320 A1 * | 12/2004 | Taylor | ............... | A61F 2/72 607/2 |
| 2005/0004709 A1 * | 1/2005 | Watanabe | ............... | B25J 9/1664 700/245 |
| 2005/0096892 A1 * | 5/2005 | Watanabe | ............... | B25J 9/1671 703/7 |
| 2006/0152533 A1 * | 7/2006 | Read | ............... | B25J 9/1671 345/653 |
| 2006/0184275 A1 * | 8/2006 | Hosokawa | ............... | B25J 9/1666 700/245 |
| 2007/0150093 A1 * | 6/2007 | Nagatsuka | ............... | B25J 9/1682 700/235 |
| 2007/0255454 A1 * | 11/2007 | Dariush | ............... | G06N 3/008 700/245 |
| 2008/0114492 A1 * | 5/2008 | Miegel | ............... | B25J 9/1664 700/248 |
| 2008/0231221 A1 * | 9/2008 | Ogawa | ............... | B25J 5/007 318/568.12 |
| 2008/0243305 A1 * | 10/2008 | Lee | ............... | B25J 9/1602 700/246 |
| 2008/0316368 A1 * | 12/2008 | Fritsch | ............... | H04N 5/23203 348/722 |
| 2009/0164202 A1 * | 6/2009 | Lonnemark | ............... | G06F 8/52 703/22 |
| 2009/0204258 A1 * | 8/2009 | Tao | ............... | B25J 9/1674 700/248 |
| 2009/0319081 A1 * | 12/2009 | Kock | ............... | G05B 19/4061 700/245 |
| 2009/0326679 A1 * | 12/2009 | Iba | ............... | G06N 3/004 700/29 |
| 2010/0241289 A1 * | 9/2010 | Sandberg | ............... | B25J 9/1689 701/2 |
| 2010/0318478 A1 * | 12/2010 | Yoshiike | ............... | G06N 3/006 706/12 |
| 2010/0318479 A1 * | 12/2010 | Noda | ............... | G06N 3/006 706/12 |
| 2011/0231016 A1 * | 9/2011 | Goulding | ............... | G06N 3/008 700/246 |
| 2011/0304633 A1 * | 12/2011 | Beardsley | ............... | B25J 9/1666 345/474 |
| 2011/0311127 A1 * | 12/2011 | Mizutani | ............... | B25J 9/1676 382/153 |
| 2011/0319910 A1 * | 12/2011 | Roelle | ............... | A61B 34/71 606/130 |
| 2012/0075072 A1 * | 3/2012 | Pappu | ............... | H04B 5/0037 340/10.1 |
| 2012/0083923 A1 * | 4/2012 | Matsumoto | ............... | B25J 9/1664 700/255 |
| 2012/0182155 A1 * | 7/2012 | Sato | ............... | B25J 9/1674 340/686.6 |
| 2012/0197439 A1 * | 8/2012 | Wang | ............... | B25J 9/1689 700/259 |
| 2012/0290132 A1 * | 11/2012 | Kokubo | ............... | B25J 9/1666 700/255 |
| 2013/0050276 A1 * | 2/2013 | Moriya | ............... | G05B 19/4069 345/672 |
| 2013/0211597 A1 * | 8/2013 | Sommerville | ............... | B25J 9/1602 700/264 |
| 2014/0277737 A1 * | 9/2014 | Sekiyama | ............... | B25J 9/1697 700/259 |
| 2014/0316570 A1 * | 10/2014 | Sun | ............... | B25J 9/1674 700/255 |
| 2014/0330432 A1 * | 11/2014 | Simaan | ............... | B25J 9/1625 700/250 |
| 2015/0202770 A1 * | 7/2015 | Patron | ............... | G05D 1/024 700/245 |
| 2015/0239127 A1 * | 8/2015 | Barajas | ............... | B25J 9/1697 700/253 |
| 2016/0016311 A1 * | 1/2016 | Konolige | ............... | B25J 5/007 700/245 |
| 2016/0016315 A1 * | 1/2016 | Kuffner, Jr. | ............... | B25J 9/1676 700/255 |

OTHER PUBLICATIONS

Surmann et al., "An autonomous mobile robot with a 3D laser range finder for 3D exploration and digitalization of indoor environments", Robotics and Autonomous Systems, pp. 181-198, Jan. 8, 2003.

Holz et al., "Continuous 3D Environment Sensing for Autonomous Robot Navigation and Mapping", University of Applied Sciences Bonn-Rhein-Sieg, Aug. 2007.

Rybski et al., "Sensor Fusion for Human Safety in Industrial Workcells", Proceedings of the IEEE/RSJ International Conference on Intelligent Robots and Systems (IROS), Oct. 2012.

Anderson-Sprecher et al., "Voxel-Based Motion Bounding and Workspace Estimation for Robotic Manipulators", International Conference on Robotics and Automation, May 2012.

Anderson-Sprecher, "Intelligent Monitoring of Assembly Operations", Master's Thesis, tech. report CMU-RI-TR-12-03, Robotics Institute, Carnegie Mellon University, Jun. 2011.

Anderson-Sprecher et al., "Background Subtraction and Accessibility Analysis in Evidence Grids", Proceedings of 2011 IEEE International Conference on Robotics and Automation (ICRA 2011), May 2011.

Translation of Japanese Office Action for Japanese Application No. 2017-501388, dated Jun. 13, 2017 (6 pages).

* cited by examiner

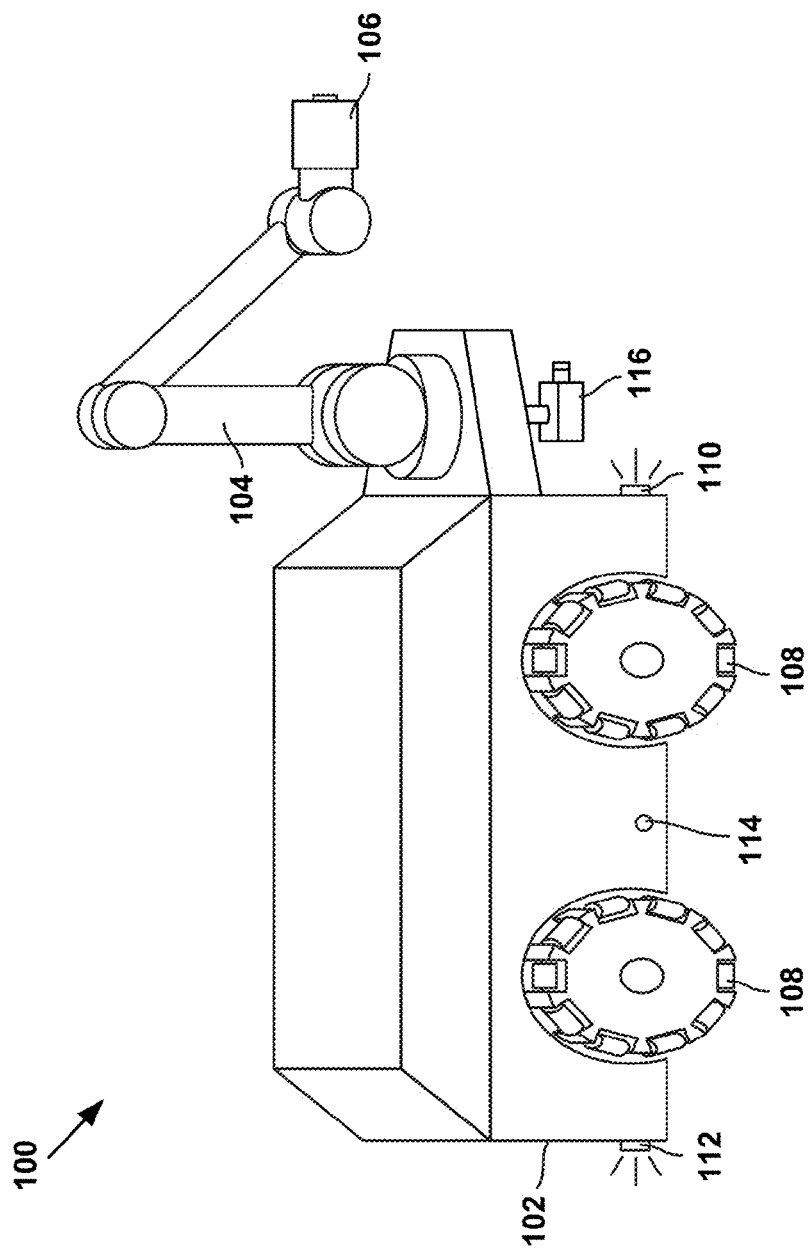

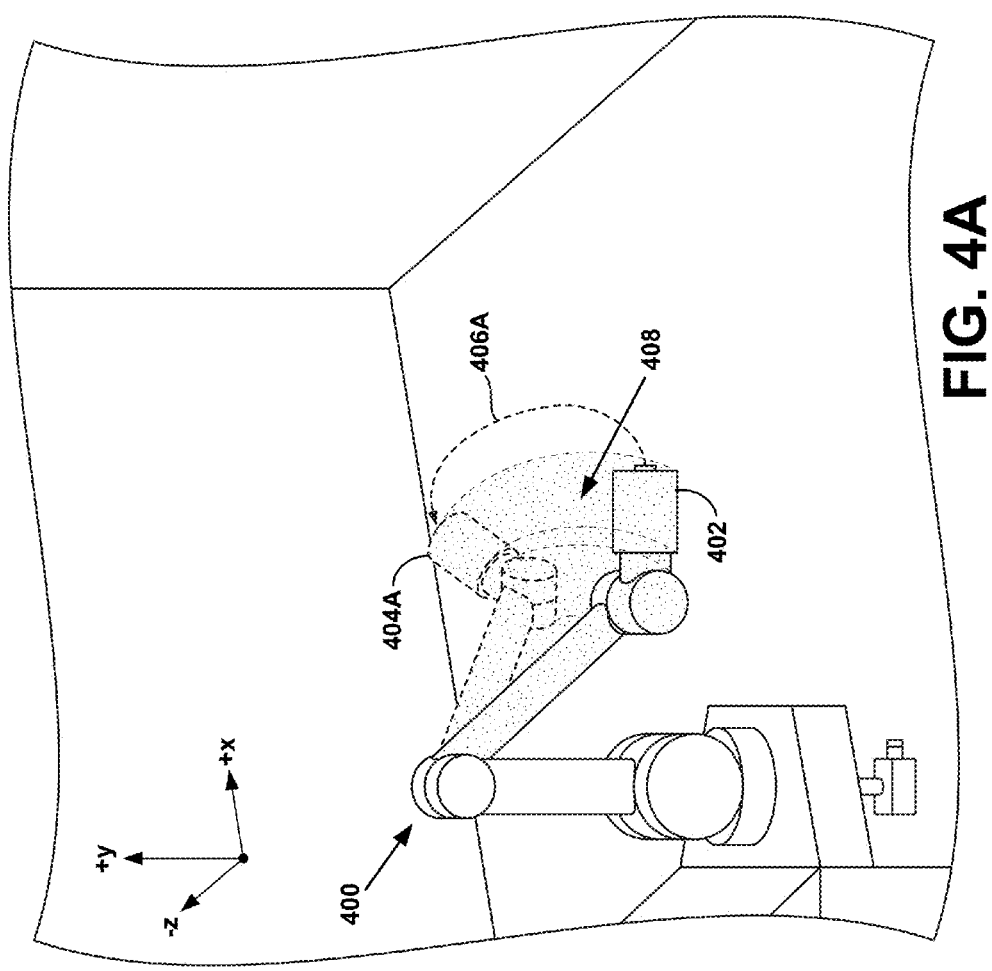

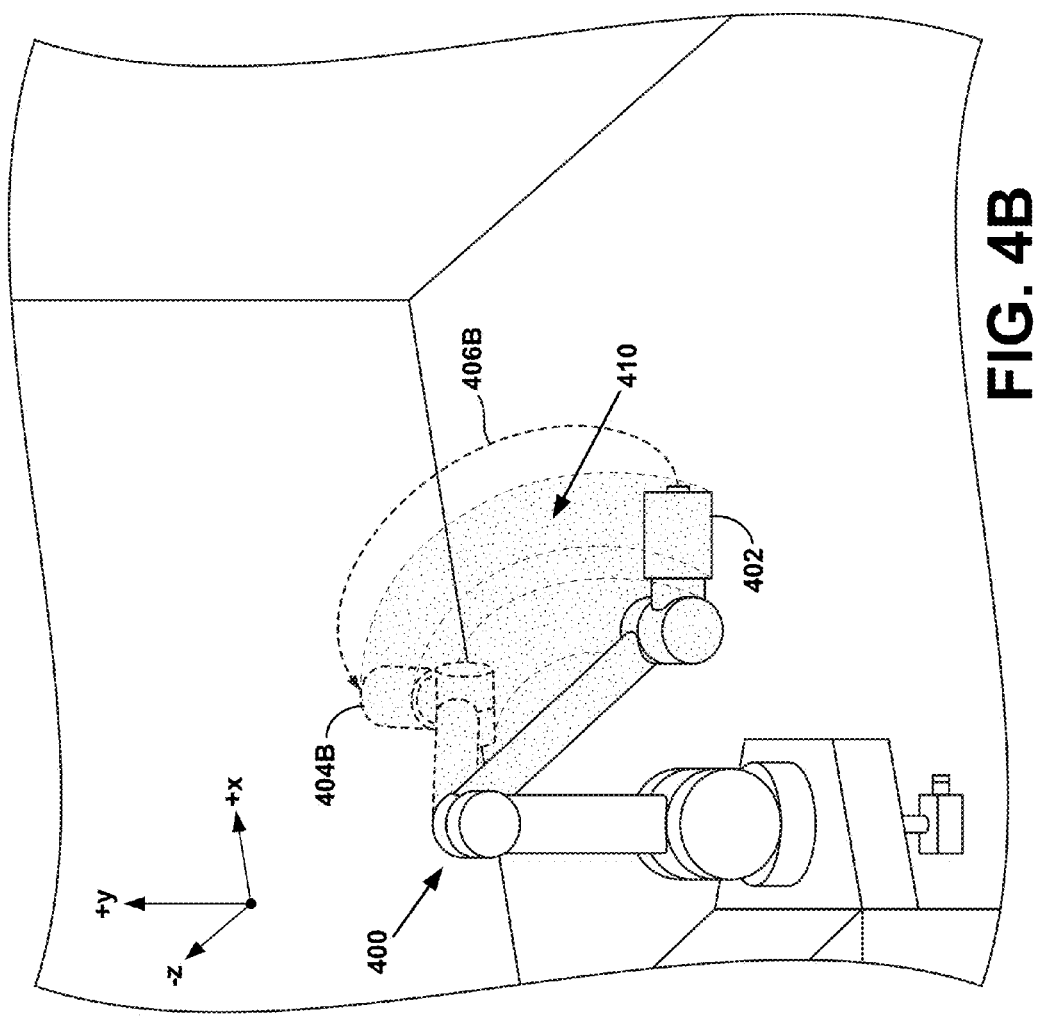

VIRTUAL SAFETY CAGES FOR ROBOTIC DEVICES

CROSS-REFERENCE TO RELATED APPLICATION

This disclosure is a continuation of U.S. patent application Ser. No. 15/005,362, filed on Jan. 25, 2016, and entitled "Virtual Safety Cages for Robotic Devices," which claims priority to U.S. patent application Ser. No. 14/333,173, filed on Jul. 16, 2014, the entire contents of each of which are herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm or another robotic device, may be used for applications involving picking up, moving, or otherwise interacting with objects of various sizes. Robotic devices such as these may be found in factories and other industrial environments, for instance. Some of these robotic devices may be non-compliant robotic devices—robotic devices that are often high-torque and that are configured to perform physical actions with little to no regard for their surrounding environment (e.g., a human walking within the vicinity of a moving robotic device). Other robotic devices such as these may be compliant robotic devices—robotic devices that take into account their surrounding environment and may employ collision avoidance systems and/or may take specialized actions in response to detecting a collision in order to reduce the likelihood of further collisions and damage to nearby objects or persons.

SUMMARY

The present application discloses embodiments that relate to virtual safety cages for robotic devices. In one aspect, the present application describes a method. The method may involve receiving an instruction requesting that a robotic device perform a physical action in a physical environment occupied by the robotic device. The method may also involve, in response to receiving the instruction, determining one or more estimated trajectories of one or more physical components of the robotic device, where the one or more estimated trajectories are one or more trajectories along which the one or more physical components are estimated to move as the robotic device performs the physical action, and where the one or more estimated trajectories are based on one or more parameters of the one or more physical components. The method may further involve determining a virtual representation of a space that the robotic device is estimated to occupy in the physical environment while performing the physical action, where the space is determined based on the one or more estimated trajectories of the one or more physical components of the robotic device. The method may still further involve providing, into the physical environment, an indication of a location of the space.

In another aspect, the present application describes a non-transitory computer readable medium having stored thereon instructions that, upon execution by a computing device, cause the computing device to perform operations. The operations may include receiving an instruction requesting that a robotic device perform a physical action in a physical environment occupied by the robotic device. The operations may also include, in response to receiving the instruction, determining one or more estimated trajectories of one or more physical components of the robotic device, where the one or more estimated trajectories are one or more trajectories along which the one or more physical components are estimated to move as the robotic device performs the physical action, and where the one or more estimated trajectories are based on one or more parameters of the one or more physical components. The method may further include determining a virtual representation of a space that the robotic device is estimated to occupy in the physical environment while performing the physical action, wherein the space is determined based on the one or more estimated trajectories of the one or more physical components of the robotic device. The method may still further include providing, into the physical environment, an indication of a location of the space.

In still another aspect, the present application describes a system. The system may include a robotic device, one or more optical devices, a wireless communication interface, at least one processor, and data storage comprising instructions executable by the at least one processor to cause the system to perform operations. The operations may include receiving an instruction requesting that the robotic device perform a physical action in a physical environment occupied by the robotic device. The function may also include, in response to receiving the instruction, determining one or more estimated trajectories of one or more physical components of the robotic device, where the one or more estimated trajectories are one or more trajectories along which the one or more physical components are estimated to move as the robotic device performs the physical action, and where the one or more estimated trajectories are based on one or more parameters of the one or more physical components. The operations may further include determining a virtual representation of a space that the robotic device is estimated to occupy in the physical environment while performing the physical action, where the space is determined based on the one or more estimated trajectories of the one or more physical components of the robotic device. The operations may still further include providing, by one or more of the wireless communication interface and the one or more optical devices, an indication of a location of the space into the physical environment.

In yet another aspect, a system is provided that includes a means for receiving an instruction requesting that a robotic device perform a physical action in a physical environment occupied by the robotic device. The system may also include a means for, in response to receiving the instruction, determining one or more estimated trajectories of one or more physical components of the robotic device, where the one or more estimated trajectories are one or more trajectories along which the one or more physical components are estimated to move as the robotic device performs the physical action, and where the one or more estimated trajectories are based on one or more parameters of the one or more physical components. The system may further include a means for determining a virtual representation of a space that the robotic device is estimated to occupy in the physical environment while performing the physical action, where the space is determined based on the one or more estimated trajectories of the one or more physical components of the robotic device. The system may still further include a means for providing, into the physical environment, an indication of a location of the space.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1A illustrates a robotic arm mounted on a moveable apparatus, according to an example embodiment.

FIGS. 4A and 4B illustrate example operations of the example method being performed, in accordance with at least some embodiments described herein.

DETAILED DESCRIPTION

Figure 1B:
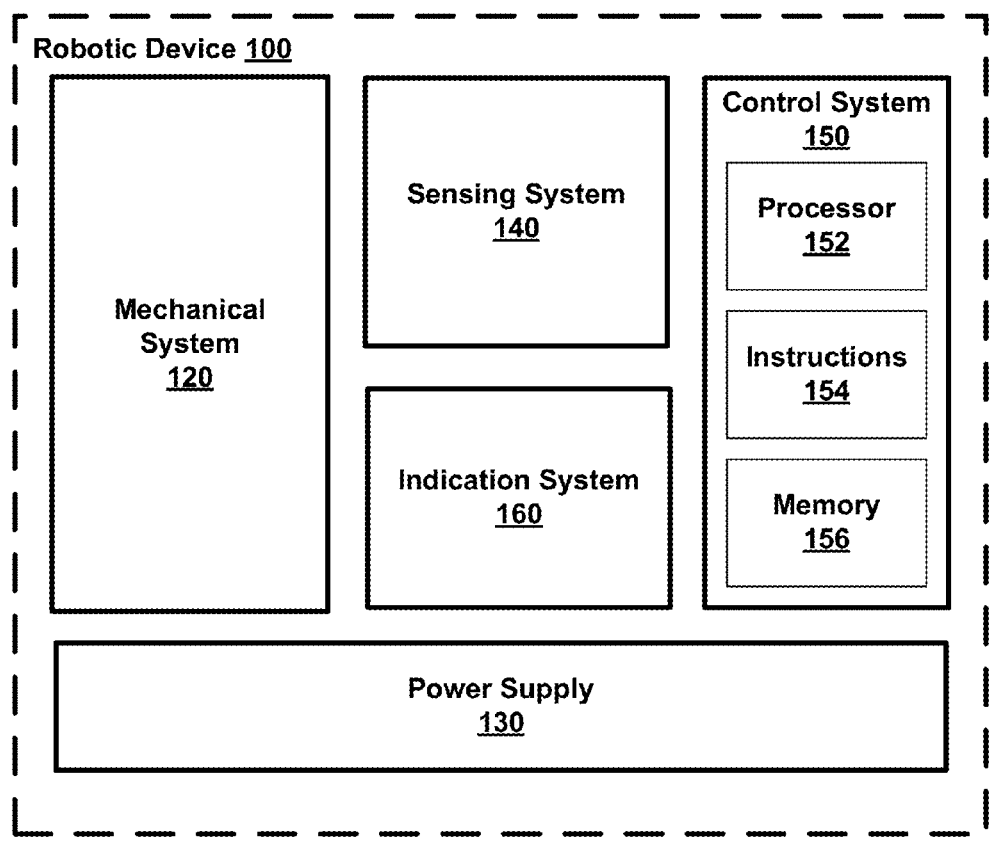
FIG. 1B is a functional block diagram illustrating a robotic device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

In the following description, the terms "sensor," "camera," or "optical sensor" may be used interchangeably and may refer to device or devices (mono or stereo arrangements) configured to perform 3D image sensing, 3D depth sensing, 2D image sensing, 2D depth sensing (i.e., 2D image and corresponding depth map), and/or other types of sensing of a physical environment of the device.

Further, in the following description, the terms "robotic device" and "robotic manipulator" may be used interchangeably to describe one or more robotic devices, such as a robotic arm, configured to grab, move, or otherwise manipulate physical objects, such as boxes, or configured to perform other actions that may involve interaction with physical objects in a given physical environment, such as humans, other robotic devices, or other types of physical objects. Further, the term "robotic manipulator" may also be used to collectively describe a combination of multiple robotic devices, such as a robotic arm mounted on a movable apparatus. It should be understood that robotic manipulators may not be limited to these configurations.

As discussed, some robotic devices may be compliant robotic devices, while others may be non-compliant. To mitigate the risk of injury to humans, robotic devices of either type may operate in environments that may be isolated from humans. In particular, such an isolated environment may include a volume of reachable space by the robotic device, where the volume is enclosed by what may be referred to herein as referred to as a "static safety cage."

Accordingly, it may be desirable for a robotic device to continuously estimate its future trajectories as well as the trajectories of nearby moving objects and humans, and dynamically determine/adjust a "virtual safety cage" that encloses a volume of reachable space of the robotic device within certain specified time limits. For instance, in some embodiments, a robotic device (or computing system associated with the robotic device) may receive an instruction requesting that the robotic device perform a physical action in a physical environment occupied by the robotic device, such as moving a robotic arm from one location to another. Then, in response to receiving the instruction, the robotic device may determine one or more estimated trajectories of the physical action based on one or more parameters of one or more physical components of the robotic device that are involved in performing the physical action. Namely, the one or more estimated trajectories may be trajectories along which the one or more physical components may be estimated to move as the robotic device performs the physical action. Within examples, such estimated trajectories may correspond to respective probabilities of the robotic device moving along the estimated trajectories to perform the physical action. For example, due to possible uncertainties that may arise with the parameters of the physical components (e.g., a joint of the robotic device may be worn or otherwise less reliable than other joints), a range of possible trajectories can be estimated, each taking into account a range of uncertainties and each having an associated confidence score.

Furthermore, based on the determined one or more estimated trajectories, the robotic device can then determine a virtual representation of a space that the robotic device is estimated to occupy in the physical environment while performing the physical action (i.e., a virtual safety cage). In some scenarios, this virtual representation can be adjusted in response to the robotic device detecting nearby moving objects or humans. For instance, the robotic device may have access to a database of previously-determined motions of humans or other objects at various speeds and trajectories, and may use this database to predict the future trajectory of the nearby moving object or human. Given a predicted trajectory of the object/human, the robotic device may compare that trajectory with its own estimated trajectory and determine to what degree the path and volume of space that the robotic device will occupy within the following predetermined time period will intersect with the path and volume of space that the object/human will occupy within that same predetermined time period. The robotic device can then adjust (e.g., expand or shrink) its virtual safety cage based on potential intersection between the two paths/volumes (or potential lack thereof).

Moreover, it may also be desirable for the robotic device to provide an indication of a location of the space into the physical environment, such as a visual and/or audio indication of the determined virtual safety cage. For example, the indication may take the form of a colored and/or flashing warning light projected in a surrounding environment of the robotic device, an audio alarm, or a 2D image representative of the virtual safety cage that is projected onto the floor around the robotic device. These indications can also be provided to remote client devices such as mobile phones, tablets, wearable computing devices, and other computing devices. Furthermore, such a client computing device may be configured to display 3D models and, as such, the robotic device may provide a 3D model/map of the virtual representation for display on the client computing device.

Within examples, determination and maintenance of a robotic device's virtual safety cage may provide a number of industrial and business advantages, such as promoting space conservation. For instance, robotic devices and humans may be able to exist and work more efficiently, and perhaps cooperatively, in a confined space. By computing accurate representations of the space that is reachable by a robotic device (even when such space is of a complicated shape) at given moments in time and for predetermined future time periods, these representations can be provided to humans and/or other robotic devices so that the humans and/or other robotic devices can avoid interference with one another or otherwise make efficient use of their shared physical environment. Other advantages are possible as well.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, a robotic device may include a robotic manipulator mounted on a movable apparatus, such as a holonomic cart (e.g., a cart with wheels that allow the cart to move in any direction). FIG. 1 depicts such a robotic device 100, which includes an example holonomic cart containing a robotic manipulator. Namely, in some embodiments, a moveable holonomic cart 102 may include a robotic arm 104 mounted on the cart. The robotic arm 104 may contain a gripping component 106 for gripping or otherwise interacting with objects within the environment. In some embodiments, the gripping component 106 may be a high-powered magnetized gripper, a hand-like gripper, a suction gripper, and/or another type of gripper. The cart may contain one or more wheels 108, which may be holonomic wheels that operate with two degrees of freedom. In other examples, the robotic device 100 may include other components, such as other robotic manipulators. In still other examples, the robotic manipulator may be mounted on a different type of movable apparatus or may not be mounted on a movable base at all. For instance, the robotic manipulator may be mounted at a fixed position within a factory setting or other setting.

FIG. 1B is a functional block diagram illustrating a robotic device, according to an example embodiment such as the robotic device 100 of FIG. 1A. The robotic device 100 could include various subsystems such as a mechanical system 120, a sensing system 130, a control system 140, as well as a power supply 150. The robotic device 100 may include more or fewer subsystems and each subsystem could include multiple elements. Further, one or more of the subsystems and elements of the robotic device 100 could be interconnected or integrated together. Thus, one or more of the described operations of the robotic device 100 may be divided up into additional functional or physical components, or combined into fewer functional or physical components. In some further examples, additional functional and/or physical components may be added to the examples illustrated by FIGS. 1A and 1B. In still further examples, one or more of the systems included in the robotic device 100 may be located remotely from the robotic device.

The mechanical system 120 may include components described above with respect to FIG. 1A, including a robotic arm 104, a gripper 106, a (movable or holonomic) cart 102, and one or more wheels 108. The mechanical system 120 may additionally include one or more motors (not shown) included in the robotic device 100 and configured to couple a plurality of rigid apparatuses together to form various components of the robotic device, such as various joints, wheels, etc. In practice, when the robotic device 100 receives an instruction to perform a particular action, each motor may be configured to receive relative instructions to perform respective actions that make up the particular action, and/or multiple motors may be configured to receive the same instruction to perform an action. Accordingly, each motor may have respective operational parameters associated to that motor to facilitate performance of that motor's particular action, such as a range of possible motor torques that the motor can withstand, among other possible operational parameters. Further, these motors may be electric motors powered by electrical power, or may be powered by a number of different energy sources, such as a gas-based fuel or solar power. Additionally, the motors may be configured to receive power from power supply 130. The power supply 130 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 140 may use one or more sensors attached to the robotic device 100, such as a front navigation sensor 110 and a rear navigation sensor 112. The sensing system 140 may also use one or more other sensors (not shown) attached elsewhere on the robotic device 100, such as sensors located on the robotic arm 104 which may sense information about a physical environment of the robotic arm as the robotic arm moves. The front and rear navigation sensors 110, 112, as well as other sensors, may function in a manner similar to that just described and/or any other manner described herein.

The sensing system 140 may determine information about the physical environment of the robotic device 100 that can be used by control system 150 (e.g., a computer running motion planning software) efficiently interact with the environment. Within examples, information obtained by the sensing system 140 may be integrated to build up a digital model of the environment. Using this information, the control system 150 may cause one or more components of the robotic device 100 to navigate into a position for performing a particular action. In additional examples, information about the physical environment of the robotic device 100, such as information extracted from 3D sensors to model the environment, may be used to maneuver the robotic device so as to avoid collisions with other physical objects in the environment or otherwise facilitate navigation of the robotic device. Further, such information may be used for environment reconstruction. Environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect.

Moreover, the control system 150 may use other information to facilitate navigation and other tasks performable by the robotic device 100. For instance, the control system 150 may combine information from the mechanical system 120 (e.g., operational parameters of the motors) with information from the sensing system 140 and/or the indication system 160 to determine a virtual representation of the future movements of the robotic device 100 at any given point in time. Within examples, the indication system 160 may then be configured to provide an indication associated with the virtual representation to surrounding environment of the robotic device 100. Accordingly, the indication system 160 may include one or more cameras/projectors (such as the optical device 116 shown in FIG. 1A), speakers, vibration generators (i.e., devices that cause vibrations), and/or other devices that are configured to provide the indication of the space into the physical environment occupied by the robotic device. For instance, upon determining that a trajectory of the robotic device 100 may interfere with the trajectory of another moving object in the environment, the optical device 116 may be configured to flash a warning light. In further examples, a speaker may be configured to provide a warning alarm. In still further examples, a vibration generator may be configured to vibrate the robotic device and/or other portions of the physical environment occupied by the robotic device. The indication system 160 may be configured to perform other operations as well.

Many or all of the operations of the robotic device 100 could be controlled by the control system 150. The control system 150 may include at least one processor 152 (which could include at least one microprocessor) that executes instructions 154 stored in a non-transitory computer readable medium, such as the memory 156. The control system 150 may also represent a plurality of computing devices that may serve to control individual components or subsystems of the robotic device 100 in a distributed fashion. The control system 150 may be located as part of the robotic device 100 or may be in remote communication with the robotic device.

In some embodiments, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2:
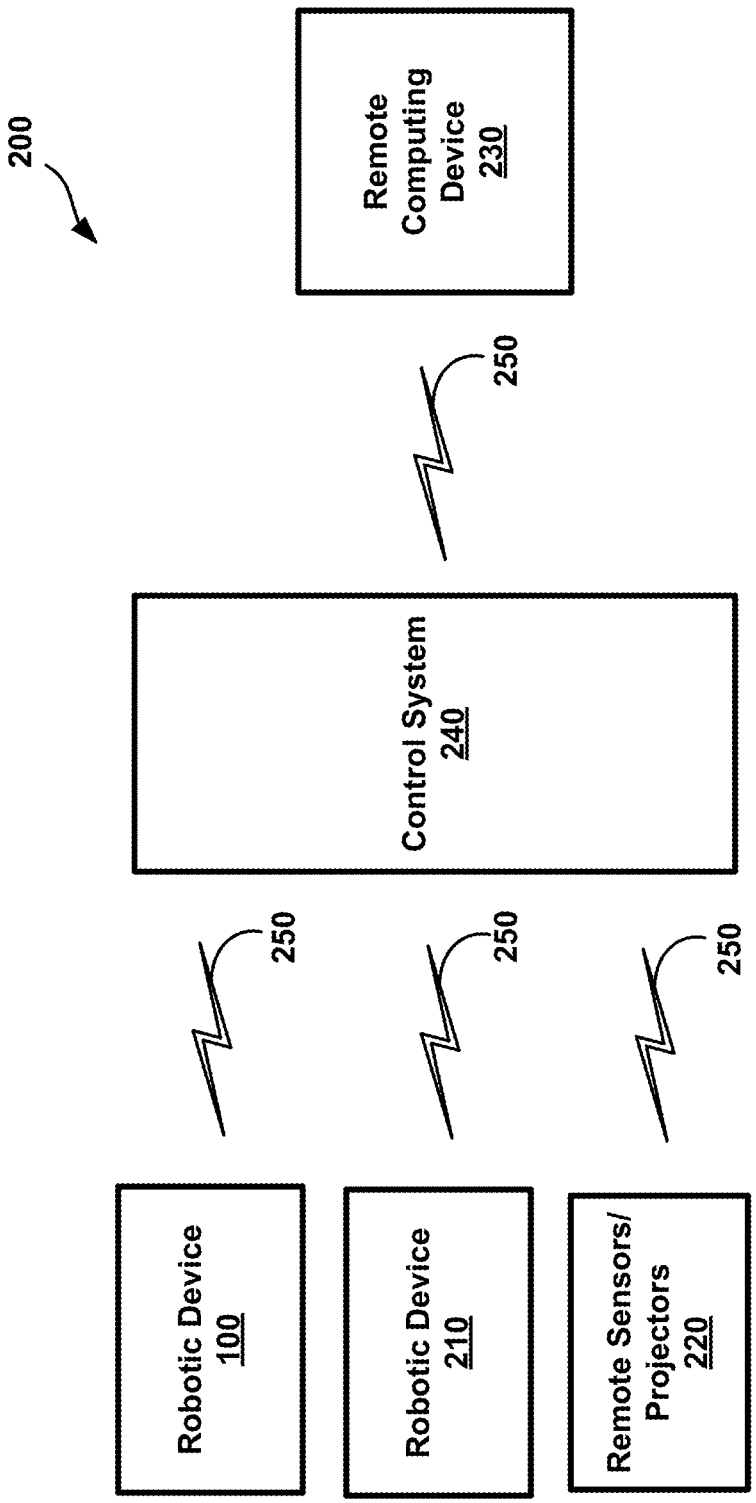
FIG. 2 is a block diagram illustrating an example system in which a robotic device may operate, according to an example embodiment.

FIG. 2 is a block diagram illustrating an example system 200 in which a robotic device may operate, according to an example embodiment. As shown, the system 200 may include the robotic device 100 described with respect to FIGS. 1A-1B, a second robotic device 210, remote sensors and/or projectors (or other such devices) 220, a remote computing device 230, and a central control system 240. In an example embodiment, each entity of the system 200 communicates with the control system 240 using respective communication links 250 (e.g., a wired or wireless connection). The control system 240 may be a control system that operates similarly to the local control system 150 of the robotic device 100 described in FIG. 1B. The control system 240 may have other operations as well, such as operations related to facilitating communication of data between each of the entities of the system 200. In some embodiments, each entity of the system 200 may each have respective control systems.

The communication links 250 are illustrated as wireless connections; however, wired connections may also be used. For example, one or more of the communication links 250 may be a wired serial bus such as a universal serial bus or a parallel bus. A wired connection may be a proprietary connection as well. The communication links 250 may also be wireless connections using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Within examples, the remote computing device 230 may be accessible via the Internet and may include a computing cluster associated with a particular web service (e.g., social-networking, photo sharing, address book, etc.).

Further, as shown, one or more entities of the system 200 may contain hardware to enable the communication links 250, such as processors, transmitters, receivers, antennas, etc. Although not shown, it should be understood that one or more of the entities of the system 200 may be in direct communication with each other (e.g., the robotic device 100 may communicate directly with the remote computing device 230 and the remote sensors/projectors 220, rather than via the control system 240).

The second robotic device 210 may be a robotic device that is configured similarly to or different from the robotic device 100 discussed with respect to FIGS. 1A-1B. The second robotic device 210 may take the form of a robotic manipulator or another type of robotic device. Within examples, the second robotic device 210 may exchange data with the robotic device 100 (perhaps directly or via the control system 240, as noted above), such as data associated with the environment of the two robotic devices, data associated with future trajectories of the two robotic devices, and diagnostic data, among other possibilities.

In some examples, the second robotic device 210 may be located proximate to the robotic device 100 or elsewhere within close distance of the robotic device 100. In other examples, the second robotic device 210 may be located in a different environment than the robotic device 100 and/or any of the other entities of the system 200. Within examples, the data communicated between the two robotic devices, as well as other data communicated between entities of the system 200, may be associated with collision avoidance, trajectory planning, and/or determination/projection of virtual safety cages of each robotic device, among other possibilities.

It should be understood that this second robotic device 210 may also be representative of other robotic devices that may also be in communication with the control system 240 and/or in direct communication with one or more entities of the system 200.

The remote sensors/projectors 220 may be any type of sensors or projectors located remotely from one or more of the entities of the system 200 (namely the robotic devices 100, 210) and operable to perform operations described herein. In accordance with the methods described herein, for instance, the remote sensors/projectors 220 may be configured, along with one or more sensors or projectors located as part of the robotic devices, to collect data associated with the environment of the robotic devices and/or provide information to the environment of the robotic devices and/or provide information to the remote computing device 230. By way of example, after the robotic device 100 and the second robotic device 210 have determined (with help by the control system 240) updated boundaries or other characteristics of their respective virtual safety cages, one or more remote projectors 220 and/or one or more projectors local to the robotic devices may project a visual representation of the virtual safety cages into the environment, such as a 3D hologram or a 2D orthographic projection. Additionally or alternatively, one or more remote speakers, horns, etc. may provide an audio representation associated with the virtual safety cages. In line with this example, the control system 240 may also provide one or more of the visual representation and the audio representation to the remote computing device 230. For instance, the remote computing device 230 may display the visual representation of the virtual safety cage to a user of the remote computing device. Other examples are also possible.

The remote computing device 230 may be any type of device that can receive data and display information corresponding to or associated with the data, such as a laptop computer, a mobile telephone, wearable computing device (e.g., head- or wrist-mountable display), tablet computing device, etc. The remote computing device 230 may include a display system comprising a processor and a display. The display may be, for example, an optical see-through display, an optical see-around display, or a video see-through display. The processor may receive data from the control system 240 and/or from other entities of the system 200, and configure the data for display on the display. The processor may be any type of processor, such as a microprocessor or a digital signal processor, for example.

The remote computing device 230 may further include on-board data storage, such as memory coupled to the processor. The memory may store software that can be accessed and executed by the processor, for example.

Further, the remote computing device 230 may be configured to perform operations on behalf of one or more entities of the system 200, such as the control system 240. For instance, the remote computing device 230 may receive data from the robotic device 100 and determine a virtual safety cage of the robotic device by performing certain processing operations on behalf of the robotic device 100 and/or on behalf of the control system 240. The remote computing device 230 may then send the resulting data back to other entities in the system 200. This functionality may be referred to as "cloud" computing.

In some embodiments, the robotic devices may upload data to the control system 240 or another remote computing device (not shown) such as a server, in order for the robotic devices to share experiences with other robotic devices to enable learned behaviors. For example, the robotic device 100 may traverse a pathway and encounter an obstacle, and can inform (e.g., through the cloud) other robotic devices, such as the second robotic device 210, of the location of the obstacle. As another example, the robotic device 100 may obtain information about a moving object via the remote sensors 220 and may estimate a future trajectory and speed of the moving object. The robotic device 100 may then share that information with the control system 240 and/or with the second robotic device 210. The second robotic device 210 may then take certain actions in response to the moving object's future trajectory and speed. Overall, the robotic devices 100, 210 may be configured to share data that is collected to enable faster adaptation, such that each robot can build upon a learned experience of a previous robot. Further, each entity of the system 200 may have access to substantially real-time data, in accordance with various embodiments described herein.

Within other examples, the system 200 may include a safety system (not shown) integrated with one of the entities shown in FIG. 2. The safety system may be configured to perform operations described herein or perform other operations in accordance with virtual safety cages.

Figure 3:
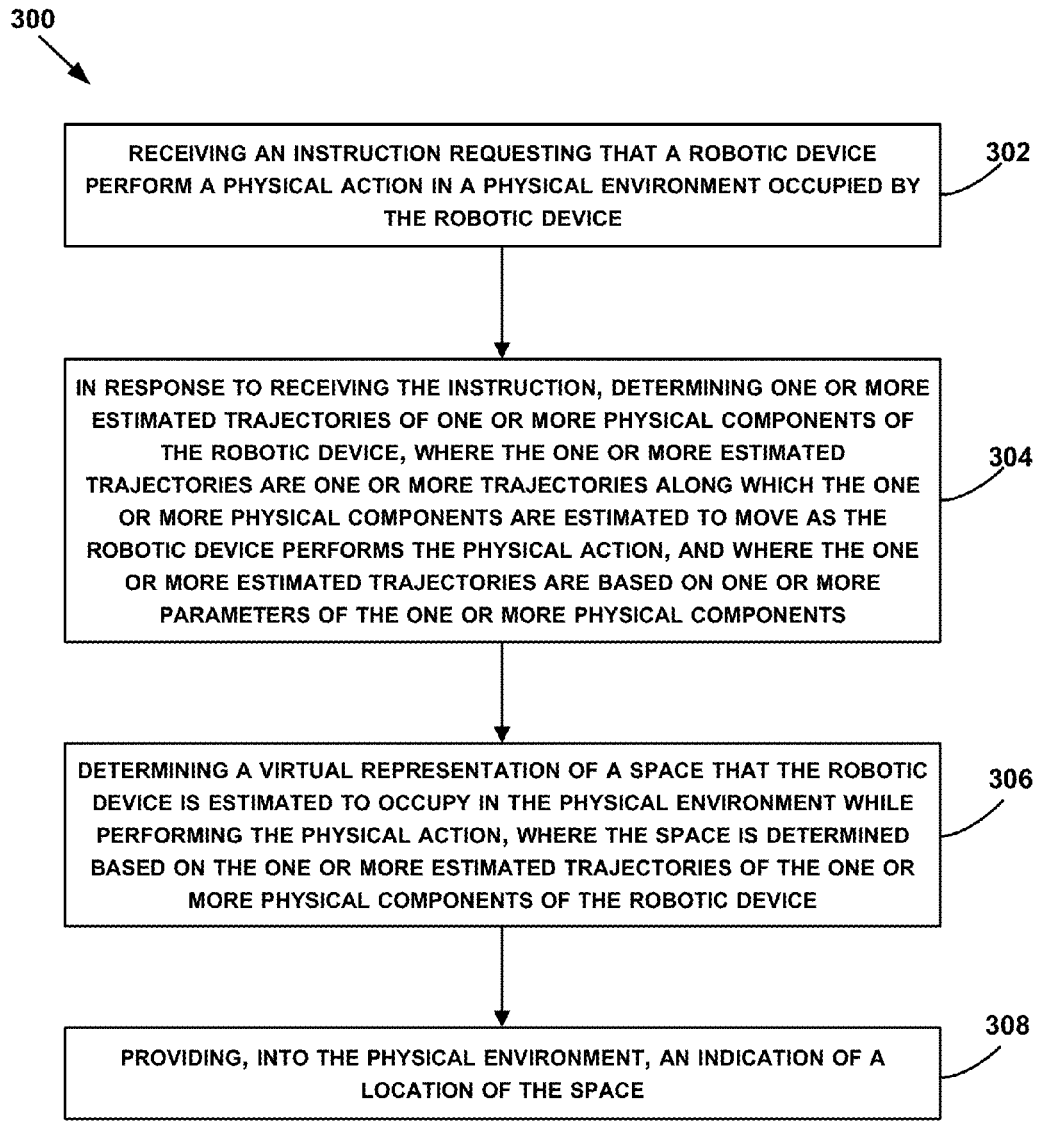
FIG. 3 is a flow chart of an example method, in accordance with at least some embodiments described herein.

FIG. 3 is a flow chart of an example method for detecting, reconstructing, and facilitating robotic interaction with an environment, in accordance with at least some embodiments described herein. Method 300 shown in FIG. 3 presents an embodiment of a method that, for example, could be used with the robotic devices and systems shown in FIGS. 1A-2, for example, or may be performed by a combination of any components of in FIGS. 1A-2, such as one or more of control systems 150 and 240. In addition, such an embodiment of a method could be carried out in accordance with the systems and aspects illustrated in FIGS. 4A-4B, 5A-5B, and 6. Method 300 may include one or more operations or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical operations in the process.

Operations of the method 300 may be fully performed by a computing device, or may be distributed across multiple computing devices and/or a server. In some examples, the computing device may receive information from sensors or other components coupled to the computing device, or where the computing device is a server the information can be received from another device that collects the information. The computing device could further communicate with a server to determine dimensions of physical objects, for example, where the server may include a database of accumulated predetermined trajectories of robotic devices and moving objects, and/or other information that may facilitate the performance of the method 300.

At block 302, the method 300 includes receiving an instruction requesting that a robotic device perform a physical action in a physical environment occupied by the robotic device. Within examples, the instruction may comprise one or more sub-instructions, that, when executed, may cause the robotic device to perform a sequence of actions. The instruction, when executed, may also cause multiple components of the robotic device to perform respective actions. For instance, the instruction may be an instruction for the robotic device to move a physical object in the physical environment occupied by the robotic device. In that scenario, execution of that instruction may cause the robotic device to move from the robotic device's current location to a location proximate to the physical object. While moving or while then remaining fixed at a position proximate to the physical object, the robotic device may then use a robotic arm or other robotic manipulator to grasp and move the physical object, perhaps while then moving again away from the previous location of the physical object. Other example instructions are possible as well.

The instruction may be received by the robotic device itself or by a control system or other computing device coupled to the robotic device or located remote from the robotic device that is configured to control the robotic device. Further, it should be understood that one or more of the operations of the method 300 may be performed before, during, or after actual execution of the received instruction.

At block 304, the method 300 includes, in response to receiving the instruction, determining (e.g., by one or more processors) one or more estimated trajectories of one or more physical components of the robotic device, where the one or more estimated trajectories are one or more trajectories along which the one or more physical components are estimated to move as the robotic device performs the physical action, and where the one or more estimated trajectories are based on one or more parameters of the one or more physical components. The one or more parameters of the one or more physical components of the robotic device that are involved in performing the physical action may include a maximum torque of the one or more physical components, a maximum power output of the one or more physical components, angles of joints of the one or more physical components, distances between two or more physical components, an effective mass of the one or more physical components (i.e., how much and a momentum of the one or more physical components, a range of motion of the one or more physical components, among other possibilities.

Within examples, certain parameters of certain physical components may be prioritized over other parameters of physical components. Within other examples, physical components with certain ranges of motion may be prioritized over other physical components of the robotic device. Within other examples, certain parameters of certain physical components may affect other parameters of the same or other physical components, and thus relationships between components may be considered in determining the one or more estimated trajectories (i.e., one joint may have a particular mass and may be coupled to another joint having a different mass, which may affect the movement of the combination of joints when performing the physical action).

Within examples, the computing device may employ one or more types of model predictive control (e.g., receding horizon control), or other types of process control to determine the one or more estimated trajectories and to perform other operations of the method 300. For instance, given a current state of the robotic device and its physical components, such as current accelerations, power outputs, momentums, etc. of one or more of the physical components, the computing device may determine a plurality of states that the robotic device and its components may be in within a certain period of time. Accordingly, the computing device may determine the one or more estimated trajectories of the physical components that the physical components are estimated to follow within a predetermined period of time, such as a predetermined period of time following execution of the instruction, following receipt of the instruction, or following other possible points of reference in time.

Within examples, the computing device may also take into account past states, past movements, and other previously-determined information associated with the robotic device and/or other robotic devices when determining the one or more estimated trajectories.

The computing device may also analyze uncertainties associated with the one or more physical components of the robotic device, where such uncertainties may create noise in the one or more determined estimated trajectories. As such, determining the one or more estimated trajectories may involve determining the one or more estimated trajectories based on uncertainties associated with the one or more physical components of the robotic device. Further, determining the one or more estimated trajectories may involve determining multiple estimated trajectories, and associating respective probabilities (i.e., confidence scores or other uncertainty metrics) to the robotic device moving along the multiple determined estimated trajectories. By way of example, one or more physical components of the robotic device that are involved in performing the physical action may have a ninety-five percent chance of moving along one trajectory when performing the action, but may also have a five percent chance of moving along a different trajectory when performing the action. Therefore, the computing device may determine two estimated trajectories for those respective probabilities. Within related examples, a family of trajectories may be determined in response to the received instruction, with each member of the family of trajectories having an associated confidence score. In such examples, the members of the family of trajectories may be aggregated together and/or superimposed. Other examples are possible as well.

In an example scenario, one or more motors may be involved in the robotic device performing the physical action, and, based on one or more parameters of those motors, such as a range of sustainable torque of the motors, the computing device may estimate a trajectory that the robotic device may occupy in space within ten seconds after the robotic device begins to perform the physical action. As a related example, the computing device may first query a database of previous trajectories by the motors, previous states of the motor parameters, and/or other information associated with the motors, and then determine that such information indicates a medium-level probability of failure of one of the motors. The computing device may then determine one or more estimated trajectories associated with the one or more motors for performing the physical action, taking into account the medium-level probability of failure. Other examples are also possible, and it should be understood that "uncertainties," as described herein, should not be limited to probabilities associated with component failure. Rather, uncertainties may represent any factor associated with one or more physical components of the robotic device that may alter one or more trajectories involved in the performance of a physical action by the robotic device.

In some embodiments, the one or more estimated trajectories of the physical components of the robotic device may take the form of at least a portion of a range of motion of one or more of the physical components. The estimated ranges of motion may be determined additionally or alternatively to the one or more estimated trajectories of the physical components that the physical components are estimated to follow within a predetermined period of time. Further, levels of uncertainty that are associated with one or more of the physical components may be determined as well. This may cause multiple ranges of motion to be determined for each physical component, each range of motion corresponding to a given probability/uncertainty representative of the likelihood of that particular range of motion occurring, in accordance with one or more parameters of that respective physical component.

Within examples, determination of the one or more estimated trajectories may also involve determination of a volume of space that one or more physical components involved in performing the physical action may occupy when the one or more estimated trajectories are executed, causing motors and/or other components to move simultaneously or non-simultaneously and sweep out the volume of space while moving along the one or more estimated trajectories. To determine the volume of space, the computing device may take into account various factors, such as a current momentum of one or more physical components, diagnostic information associated with one or more physical components, or other factors noted above, both associated with a current state of the one or more physical components and associated with a past state of the one or more physical components (or a past state of one or more related physical components that are not included as part of the robotic device).

Within examples, one or more volumes may be determined, one or more of the volumes being associated with respective probabilities. And in line with the discussion of determined estimated trajectories, multiple determined volumes of space may be aggregated together, superposed, or superimposed. For instance, a superposition of multiple volumes of space corresponding to respective estimated trajectories of the multiple determined estimated trajectories may include multiple different volumes of spaces that the robotic device is estimated to occupy to perform the physical action.

In still further examples, the computing device may determine the estimated trajectories by providing the instruction to perform the physical action to a server, which executes a number of simulations and returns to the computing device parameters associated with the estimated trajectories.

At block 306, the method 300 includes determining a virtual representation of a space that the robotic device is estimated to occupy in the physical environment while performing the physical action (i.e., a virtual safety cage), where the space is determined based on the one or more estimated trajectories of the one or more physical components of the robotic device. For instance, when the one or more estimated trajectories are multiple estimated trajectories associated with a plurality of probabilities, confidence scores, or other metrics, the virtual representation of the space in the physical environment of the robotic device may be determined based on the multiple estimated trajectories and further based on respective probabilities, the respective probabilities being associated to the robotic device moving along the multiple determined estimated trajectories (i.e., a likelihood of physical components of the robotic device occupying a given trajectory).

In some examples, the virtual representation may take the form of a virtual boundary or virtual full volume that may include at least a portion of the space that will be occupied by physical components of the robotic device in the future.

Within examples, the virtual representation may take the form of a more conservative virtual boundary/volume, such as a spherical, ellipsoidal, or parabolic boundary/volume including the volume of space. Other open quadric surfaces or closed quadric surfaces (and/or associated volumes) are possible as well. Within such examples, the virtual representation may include more space in the physical environment of the robotic device that exceeds the actual space that the robotic device will physical occupy over time. Within other examples, the virtual representation may take the form of an isosurface or other surface or volume that more-restrictively bounds the movement of the robotic device. In environments where multiple robotic devices and/or humans are working in close proximity to one another, for instance, less conservative virtual representations may be desirable.

In some scenarios, the received instruction may be an instruction for the robotic device to pick up and move a physical object. In such scenarios, the computing device may determine, based on one or more estimated trajectories and/or based on one or more predetermined characteristics of the physical object (e.g., size, weight, etc.), for instance, a virtual representation of both space in the physical environment that the robotic device will occupy and space that the physical object is estimated to occupy based on the robotic device moving the physical object. For example, in response to receiving such an instruction, the computing device may query a database that may have information about a size of the physical object that is to be moved by the robotic device. The computing device may then take into account the size of the physical object when determining the one or more estimated trajectories or when determining the virtual representation. For instance, the computing device may determine a traced-out volume in space using a point on a surface of the physical object that is farthest from a reference point on the robotic device, the traced-out volume being representative of space that the robotic device and physical object will occupy during at least a portion of the time that will elapse as the robotic device picks up and moves the physical object.

In some embodiments where the computing device determines the one or more estimated trajectories of the physical components that the physical components are estimated to follow within a predetermined period of time, the space of the virtual representation may thus include space that the robotic device is estimated to occupy to perform the physical action during the predetermined period of time.

Within examples, a new virtual representation may be determined each time a new instruction or sub-instruction is received or executed by the computing device. Thus, the virtual representation may be an animated representation that changes in real-time as a new instruction is received or a modification to the estimated trajectory is determined. Within other examples, the computing device may be configured to tune (i.e., adjust) the virtual representation in response to receiving a user input or another type of input indicating a command to perform the tuning. Within such examples, the virtual representation may be adjusted based on a variety of factors, such as probabilities and risk. For instance, a virtual representation may be adjusted from a less conservative virtual safety cage to a more conservative virtual safety cage, where the more conservative virtual safety cage includes space associated with additional future trajectories, despite those future trajectories being less-probable. Such a conservative adjustment may reduce risk of collisions or other hazards. Alternatively, the virtual representation may be adjusted to only include future trajectories and space with high confidence scores. Other examples are also possible.

Within still other examples, upon receiving an instruction for the robotic device to move from a first location, pick up an object at a second location and move the object to a third location, the virtual representation may be automatically or manually be adjusted in accordance with the robotic device carrying out this task, and also based on the predetermined period of time discussed above. For instance, before receiving such an instruction, the virtual representation may include a smaller volume of space surrounding the robotic device at the first location. Then, upon (or some time after) receiving the instruction, the virtual representation may expand to include the second location, and perhaps additionally the third location, as well as one or more probable future paths (and associated volumes) the robotic device may travel/occupy between the first and second locations and between the second and third locations. Upon reaching the second location, or as the robotic device travels to the second location, the virtual representation may be dynamically adjusted to shrink, so as to no longer include the path/space that the robotic device previously occupied when travelling from the first location to the second location. A similar, further adjustment may then be made as the robotic device travels to the third location, or upon the robotic device reaching the third location. Other examples are possible as well. As discussed above, in these and other examples, the robotic device may be in communication with projectors or other devices configured to provide an indication of where the robotic device will occupy in the future, whether during a short period of time or a longer period of time.

Accordingly, at block 308, the method 300 includes providing, into the physical environment, an indication of a location of the space. Further, within at least a portion of the examples described herein, the indication may include visual indications of aggregated or superposed spaces/boundaries, and/or may include distinguishable, superimposed visual indications of such spaces/boundaries associated with the one or more estimated trajectories. Still further, the indication may include a visual indication of a probability, confidence score, or other metric associated with the one or more estimated trajectories determined at block 304, and corresponding spaces/boundaries determined at block 306. Yet still further, the indication may include a visual indication, /or audio indication, and/or other type of indication of the one or more estimated trajectories determined at block 304.

Within examples, audio indications may include alarms, ambient noise, one or more spoken utterances, prerecorded safety messages, structured audio patterns, and other types of audio with varying frequency, rhythm, volume, timbre, etc. Different audio indications may be used for different determined virtual representations of space. Additionally or alternatively, multiple different audio indications may be included in the indication. By way of example, when the robotic device or external sensors detect a moving object within the physical environment of the robotic device, the computing device may cause a sound to be played via a speaker in the environment when the moving object is within a given range of distance from the robotic device, and may cause other, different sounds to be played when the moving object is within other ranges of distance from the robotic device (e.g., louder, more prominent sounds may be heard when a moving object is within close proximity to the robotic device and potentially at risk of colliding with the robotic device). As another example, a quiet, calming noise may be intermittently or continuously played in the environment when the current virtual representation associated with the robotic device is a more conservative virtual representation (i.e., a larger virtual safety cages with less safety risk), whereas a louder noise may be intermittently or continuously played in the environment when the current virtual representation is a less conservative virtual representation, or vice versa. Other examples are possible as well.

The indication may include 2D indications and/or 3D indications. Within examples, a projector attached to the robotic device or located remotely from the robotic device may project a light associated with the space. For instance, the light may be projected on some or all areas of the floor below space where the robotic device may occupy in the future, and may serve as a warning light. The light may be projected on another surface as well, such as a wall, ceiling, or another surface in the physical environment of the robotic device. Additionally or alternatively, light may be projected into the air without being aimed at any particular surface. The light may be projected as one or more colors or shades of colors. For instance, when the space includes areas or volumes of uncertainty, light of a different color or brightness may be used to indicate less-probable areas where the robotic device may occupy in the future. Other examples are possible as well.

Within other examples, the indication may take the form of a 2D image of the space projected on a surface in the physical environment of the robotic device. For instance, the 2D image may be an orthographic projection of a 3D virtual representation (e.g., hollow 3D boundary or full 3D volume). The 3D virtual representation may be orthographically projected on to a floor or wall, for instance, and may serve as a more detailed and distinguishable visual indication than the light described above. As another example, the 2D image may be a top-down or other perspective map of the physical environment, including a highlighted or otherwise indicated 2D area associated with a current state of a virtual safety cage. Within these examples, the 2D image may depicts one or more 2D paths representative of the determined one or more estimated trajectories (e.g., the 2D image may include a traced line representative of the future path of one or more physical components of the robotic device). Further, the 2D image may also depict individual components of the robotic device and their respective trajectories. Still further, the 2D image may include numerical or other visual indications of probabilities associated with the one or more estimated trajectories. Other examples are possible as well.

Within further examples, the indication may take the form of a holographic 3D indication of the space, accomplished by varying uses of lasers (e.g., plasma lasers), interference, diffraction, light intensity, and/or other parameters known or not yet known in the field of holography. Such an indication may be an actual-scale hologram, projected so as to "fill" the airspace at least where the robotic device will occupy in the future. Additionally or alternatively, the indication may be projected as a smaller-scale hologram. The 3D hologram may also depict one or more 3D paths representative of the determined one or more estimated trajectories, projected within the space in the physical environment occupied by the robotic device. For instance, the trajectories may be visually indicated as holographic images, or may be indicated by one or more lights (e.g., thin, directed lasers) projected along the path of the trajectory, among other possibilities. The 3D hologram may be projected or otherwise displayed as an open quadric surface, a closed quadric surface, convex hull, isosurface, or other complex or non-complex surface/volume.

Within still further examples, the indication may take the form of a 3D model of the virtual representation. The 3D model may depict one or more 3D paths representative of the determined one or more estimated trajectories. Further, the 3D model may include an open quadric surface, a closed quadric surface, convex hull, isosurface, or other complex or non-complex surface/volume.

Similar to the 2D indications, the 3D indications may include multiple spaces that are aggregated, superposed, superimposed, etc. in order to indicate a family of possible future movements by the robotic device.

Within yet still further examples, the indication may involve a projector, camera, or other optical device projecting a light onto a physical object associated with the received instruction. For instance, the robotic device may project a single beam of light on a box that the robotic device has been instructed to pick up, thus indicating to humans or other robotic devices that the robotic device plans to move towards the box and pick it up. The light may be projected at some point after receiving the instruction and may be projected for a predetermined period of time.

Within yet still further examples, the indication may take the form of a vibrational indication or other type of indication that modifies the physical environment occupied by the robotic device. For instance, a vibration generator device coupled to the robotic device or located remotely from the robotic device may vibrate an area of the ground in the physical environment or another portion of the physical environment, such as a wall, pillar, or other physical object in the physical environment. In another example, the computing device may provide a notification to a remote computing device such as a mobile phone or other wireless communication device that causes that remote computing device to vibrate. Such a vibration may serve to warn a user of that remote computing device that they have entered or are about to enter the virtual safety cage of the robotic device. Other examples are possible as well.

In some embodiments, the computing device may provide the indication to a remote computing device, such as the remote computing device shown in FIG. 2. As noted above, the remote computing device may be a computing device that is configured to display or otherwise provide the indication at the remote computing device. For example, the computing device may provide a dynamic virtual 3D model or other type of 3D representation of the virtual safety cage to a wearable computing device with a head-mountable display. Such a indication may be provided to other computing devices with augmented reality capabilities as well. As another example, the computing device may provide a 3D model to a tablet computing device with a touchscreen, where a user of the tablet computing device can then zoom in on the 3D model or otherwise interact with the 3D model. For instance, the user may be able to select individual components of the robotic device that are involved in performing the physical action and view those components' future trajectories, uncertainty levels, individual virtual safety cages, and other information associated with the individual components, such as a numeric display of the one or more parameters (e.g., power levels, current velocities, etc.). The one or more estimated trajectories may also be displayed, as well as probabilities that correspond to each estimated trajectory. Furthermore, the user of the remote computing device may be able to remotely adjust the indication of the space. For instance, the remote computing device may include a dial or other adjustable input device that the user can manipulate to increase or decrease the size of the virtual safety cage. Other examples are also possible.

In some embodiments, the indication may be provided continuously while the robotic device performs at least a portion of the physical action. For example, when the instruction is for the robotic device to move from one location to another, a 3D virtual safety cage boundary may be projected continuously as the robotic device moves from the one location to the other. In such examples, the virtual safety cage may retain its size and shape while visually appearing to be displaced, along with the robotic device, from the one location to the other location, although in other examples, the virtual safety cage may change its size or shape while the robotic device moves, such as if the robotic device suddenly detects a moving object approaching the robotic device, for instance. Other examples are possible as well.

Within examples, and in line with the discussion above, the robotic device may include at least one robotic manipulator involved in performing the physical action, such as one or more robotic arms. As such, the method 300 may include operations for determining respective ranges of motion for the at least one robotic manipulator involved in performing the physical action. Thus, determining the virtual representation may be based at least in part on the determined respective ranges of motion for the at least one robotic manipulator, and the indication may include a visual indication of the determined respective ranges of motion.

Within examples, virtual safety cages may be determined and adjusted based on moving objects detected in the physical environment of the robotic device, such as humans, vehicles, and other robotic devices, among other possibilities. Within such examples, the computing device may use one or more sensors in the environment to identify the moving object. For instance, the computing device may employ static background subtraction or a more probabilistic approach, such as a Kalman filter, to separate static obstacles in the environment from dynamic obstacles in the environment.

Responsive to identifying the moving object, the computing device may determine, via one or more sensors and/or other device(s), parameters associated with the moving object, such as the moving object's current velocity, current acceleration, current direction of movement, and the object's mass, among other possibilities. The computing device may then determine, based at least in part on the determined parameters of the moving object, an estimated trajectory of the moving object along which the moving object is estimated to travel over a predetermined period of time. Other estimated trajectories may be determined as well, perhaps based on predetermined uncertainties associated with the moving object. Further, the predetermined period of time in this scenario may begin when the parameters are determined, or may begin at another point in time. Still further, the predetermined period of time discussed herein with respect to the moving object may be the same or different from the predetermined period of time discussed above with respect to the robotic device.

In practice, the predetermined periods of time discussed herein may refer to a sum of a period of time that is necessary to execute a safety stop or other type of safety maneuver (e.g., collision avoidance) and a period of time needed for one or more processors to compute the parameters (e.g., volume) of the virtual safety cages.

Within these examples, motion prediction of moving objects for safety purposes that may require more immediate responsive action to be taken by the robotic device (i.e., "short-range prediction") may be performed in accordance with uniform motion bounds associated with human-based safety standards (e.g. assume humans can move at most 3 meters/second). Short-range prediction may allow the robotic device to come to a safe stop in the event of any unforeseen obstacles, and may require conservative motion estimates of one or more of the robotic device and the moving object. Further, motion prediction that may require less immediate responsive action to be taken by the robotic device and that may facilitate smooth responsive operation of the robotic device (i.e., "long-range prediction") may employ probabilistic approaches, such as a Kalman filter or a particle filter combined with learned priors for high-traffic zones (i.e., certain regions, such as walkways, that are observed over time that frequently have people or other moving objects/obstacles moving through them, and thus should be given increased weight in a probability distribution among regions). Long-range prediction may enable avoidance behaviors that may reduce the need for more-immediate safety stops, and may operate with less certainty regarding motion estimates. In some embodiments, a computing device may implement both short-range prediction and long-range prediction concurrently.

The computing device may have access to a local or remote database of predetermined motions of humans and other moving objects at various speeds, masses, trajectories, and/or other parameters of the past moving objects, and may use this database to predict the future trajectory of the detected moving object. Accordingly, the computing device may determine at least one estimated trajectory based in part on predetermined parameters of moving objects that are at least partially similar to the detected moving object. For instance, the computing device may extrapolate future motions of moving objects based on predetermined motions of other moving objects (or possibly predetermined motions of the same moving object).

Next, the computing device may compare the estimated trajectory of the moving object with the one or more estimated trajectories of the physical components of the robotic device determined at block 304. For example, the computing device may determine whether one or more estimated trajectories of the moving object will intersect or otherwise interfere with the one or more estimated trajectories of the physical components of the robotic device, and perhaps limiting this determination to intersection that may occur within a predetermined time period, in some embodiments. As another example, the computing device may use parameters of the moving object and the one or more estimated trajectories of the moving object to determine one or more estimated volumes of space the moving object may occupy within a predetermined period of time, the one or more estimated volumes of space perhaps being associated with relative probabilities. The computing device may then determine whether the one or more estimated volumes of space of the moving object overlap with one or more volumes of space that the robotic device may occupy within the predetermined period of time. As yet another example, when the computing device determines that the moving object will not intersect with trajectories of the robotic device, the computing device may still compare a distance from the robotic device and the trajectories of the robotic device to the trajectories of the moving object with the trajectories of the robotic device when adjusting the virtual safety cage of the robotic device. Other examples are possible as well.

Based on an output of the comparison, the computing device may then adjust the virtual representation of the space in the physical environment occupied by the robotic device and provide, into the physical environment, an indication of a location of space associated with the adjusted virtual representation. For instance, if the computing device determines that the moving object will soon come within a given distance of the robotic device's trajectory, the computing device may shrink the virtual safety cage by adjusting the robotic device's trajectory or other constraints on the robotic device's motion. Accordingly, the indication may include one or more of a visual indication and an audio indication of the location of the space represented by the adjusted virtual representation, such as one or more of the visual and audio indications described above. Further, the indication may also visually depict a path representative of the determined estimated trajectory of the moving object, such as in a manner similar to that described above.

Further, in some examples, the computing device may determine a virtual safety cage for the moving object by implementing one or more of the operations described herein. For instance, based on the one or more estimated trajectories of the moving object and further based on parameters of the moving object (and perhaps still further based on data associated with previous moving objects), the computing device may determine a virtual representation of a volume of space in the physical environment of the robotic device, the volume of space including space that the moving object is estimated to occupy.

In response to the output of the comparison noted above, and perhaps in response to other determinations made regarding the moving object, the computing device may perform other actions as well. For instance, the computing device may instruct the robotic device to reduce its speed, stop, and/or alter its trajectory to avoid collision between the robotic device and the moving object. Furthermore, the computing device may communicate an impending collision or potential collision to the surrounding environment of the robotic device and the moving object by projecting a warning light and/or sounding an alarm, among other possibilities. Still further, the computing device may set the robotic device to operate in a "safe moving mode" in which the robotic device may take one or more of the actions noted above to avoid collisions or otherwise safely operate in the environment.

Within examples, at some point after identifying a moving object in the environment of the robotic device, the computing device may identify, via one or more sensors in the physical environment of the robotic device, that the moving object is outside of a threshold distance from the robotic device. For instance, the computing device may determine that the robotic device is no longer at risk of colliding or otherwise interfering with the moving object. In response to identifying that the moving object is outside of the threshold distance, the computing device may then expand the virtual representation of the space in the physical environment such that the space is increased. The computing device may then provide an indication associated with the expanded virtual representation, where the indication includes one or more of a visual indication of the expanded space and an audio indication of the expanded space.

Within examples, the robotic device may be instructed to move at higher speeds when no moving objects are detected or when moving objects are determined to be of threshold low risk (e.g., such moving objects are a predetermined distance away from the robotic device) to the robotic device performing the physical action. Further, the virtual safety cage that the computing device maintains for the robotic device may expand and grow over time when no humans or other moving objects are detected within a given distance. Conversely, as predicted future motions of humans or other moving objects begin to overlap with robot, or when humans or other moving objects generally approach the robotic device, the computing device may instruct the robotic device to slow down and may begin to gradually shrink the virtual safety cage. In some examples, if a human or other moving object is detected to be within a predetermined and calibratable threshold distance, the robotic device may stop all its motion completely and the virtual safety cage may be set to zero (i.e., disappear). Other examples are possible as well.

It should be understood that, in practice, there may be trade-offs between safety guarantees and system performance of a robotic device. Thus, approaches to trajectory determination and virtual safety cage determination may be combined to allow fail-safe operation when needed, whereas elegant, non-emergency adjustments to trajectories of the robotic device (e.g., re-routing the robotic device) may be preferred under normal circumstances.

It should also be understood that the operations of detecting and monitoring moving objects may be performed continuously or intermittently so as to dynamically adjust the virtual representation and dynamically update the indication corresponding to the dynamically-adjusted virtual representation.

It should still further be understood that one or more operations of this method may be performed continuously or intermittently so as to dynamically adjust the virtual representation and dynamically update the indication corresponding to the dynamically-adjusted virtual representation. Within examples, for instance, ranges of motion that physical components of the robotic device could have at any given point in time can be continuously or frequently computed and provided to other people/devices. And within examples, a robotic device and/or an associated system may continuously or frequently monitor the surrounding environment of the robotic device in order to maintain a virtual safety cage. Other examples are possible as well.

FIGS. 4A and 4B illustrate example operations of the example method being performed, in accordance with at least some embodiments described herein. FIG. 4A illustrates a robotic device 400 moving from a first position 402 to a second position 404A along a first trajectory 406A, whereas FIG. 4B illustrates the robotic device moving from the first position to a different second position 404B along a longer, second trajectory 406B. Accordingly, the computing device (not shown) may determine a first virtual representation 408 based on the first trajectory 406A and may also determine a second virtual representation 410 based on the second trajectory 406B. As shown, the space of the first virtual representation 408 is less than the space of the second virtual representation 410 because physical components (e.g., joints, rigid arm segments, and gripper, as shown) of the robotic device 400 may occupy more space while moving along the second trajectory 406B. Within examples, the first and second virtual representations 408, 410 may be projected as 3D holograms in the environment of the robotic device 400 or may be otherwise indicated to a user, to a user's computing device, to other robotic devices, etc. Further, these respective 3D holograms may be aggregated (which may result in merely a hologram of the second virtual representation 410 in this case, as the second virtual representation includes approximately all of the first virtual representation 408), superposed, superimposed, or otherwise integrated together.

Within further examples, the computing device may estimate the first trajectory 406A to be a higher-probability trajectory, whereas the computing device may estimate the second trajectory 406B to be a lower-probability trajectory, or vice versa. For instance, there may be a 96% probability associated to the first trajectory 406A and there may be a 4% probability associated to the second trajectory 406B, perhaps due to a previously-detected error with one or more components of the robotic device 400 that may have previously caused the robotic device to move beyond where the robotic device was instructed to move. Other examples are also possible.

Within still further examples, the computing device may determine a full or partial range of motion of one or more of the joints of the robotic arm, one or more of the rigid arm segments of the robotic arm, the gripper of the robotic arm, and/or other physical components. Accordingly, indications of the first and second spaces represented by the first and second virtual representations may then include visual indications of those ranges of motion. For instance, the second trajectory 406B may, in some scenarios, be the extent of the robotic device's range of motion in the z-direction (i.e., the robotic device may be designed to only move between the first position 402 and position 404B in the z-direction).

Figure 5A:
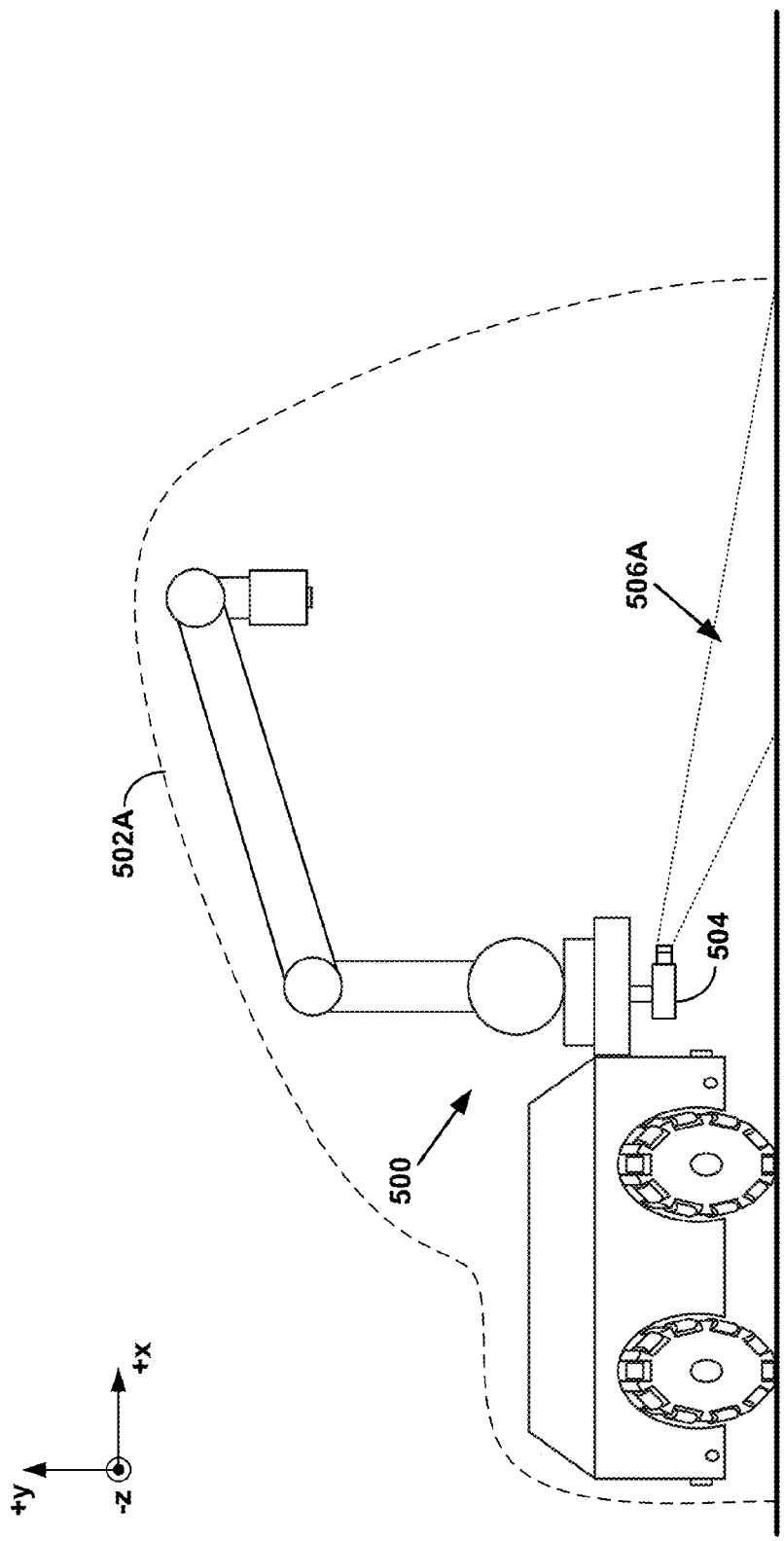
FIGS. 5A and 5B illustrate example operations of the example method being performed, in accordance with at least some embodiments described herein.
Figure 5B:
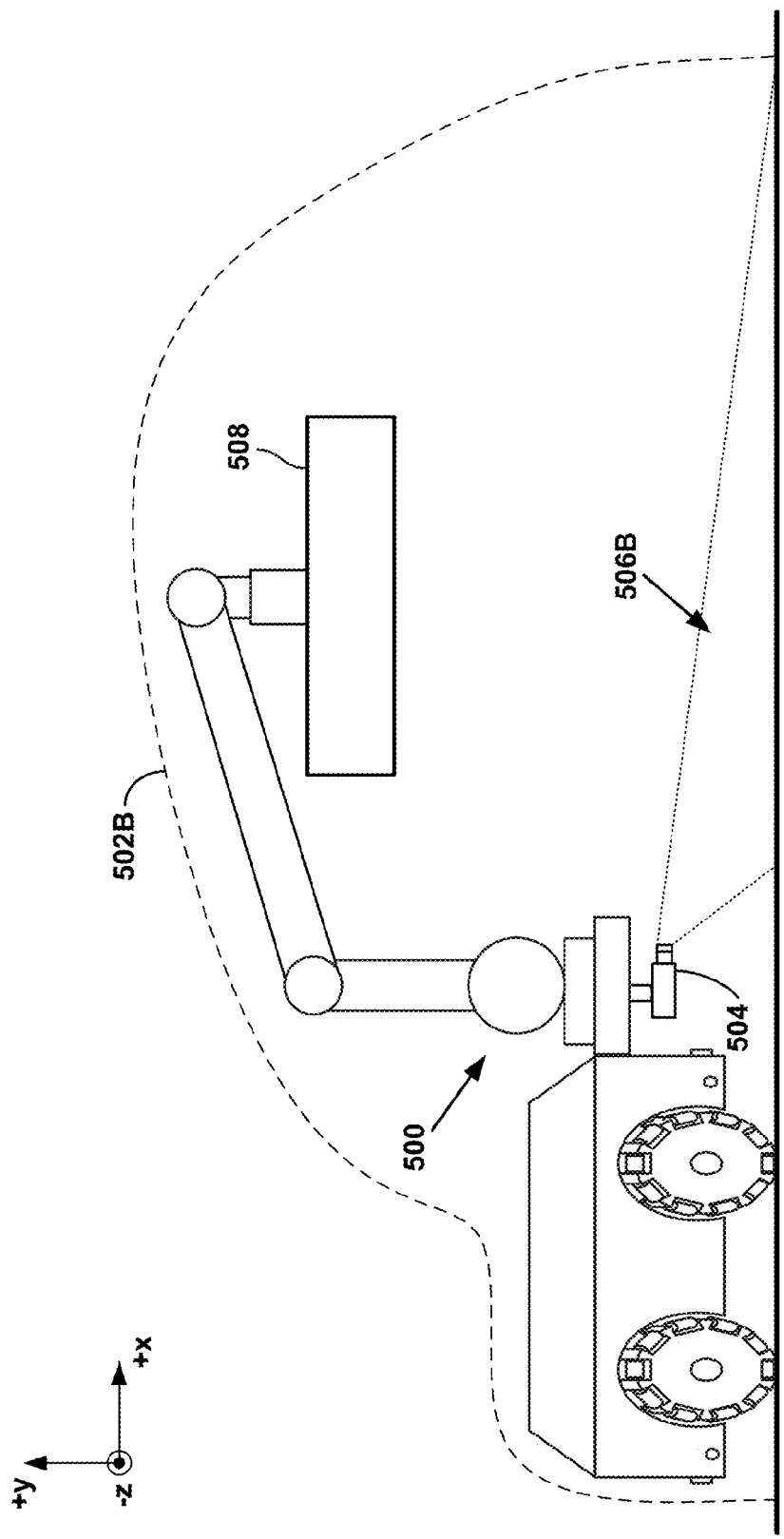

FIGS. 5A and 5B illustrate example operations of the example method being performed, in accordance with at least some embodiments described herein. FIG. 5A illustrates a robotic device 500 with a complex-volume virtual safety cage boundary 502A, resembling an isosurface shell. The virtual safety cage 502A may bound, for instance, all future movements and ranges of motion by the robotic device 500 within a predetermined time period, in accordance with the method 300 described above. The virtual safety cage 502A may be visible in the environment by a human (e.g., projected as a hologram), or may instead be visible only as a 3D model provided for display on a remote computing device, among other possibilities. Further, a projector 504 coupled to the robotic device 500 may project, onto a floor in the environment of the robotic device, a light 506A that illuminates an area on the floor below where at least one physical component of the robotic device may occupy within the predetermined period of time.

FIG. 5B illustrates an adjusted complex-volume virtual safety cage boundary 502B. The virtual safety cage 502B may be expanded in comparison to the virtual safety cage 502A of FIG. 5A and may bound all future movements and ranges of motion by the robotic device 500 within a predetermined time period while the robotic device is gripping a physical object 508. Such a cage 502A may also take into account a size and dimension of the physical object 508, and an area that the physical object 508 will occupy when be moved by the robotic device. In this case, the projector 504 may project, onto a floor in the environment of the robotic device, a different light 506B that illuminates an area on the floor below where at least one physical component of the robotic device may occupy within the predetermined period of time while handling the physical object 508. The different light 506B may be of a different color, may be projected to flash repeatedly, or may be provided in another manner different from the manner of which the other light 506A was provided.

Figure 6:
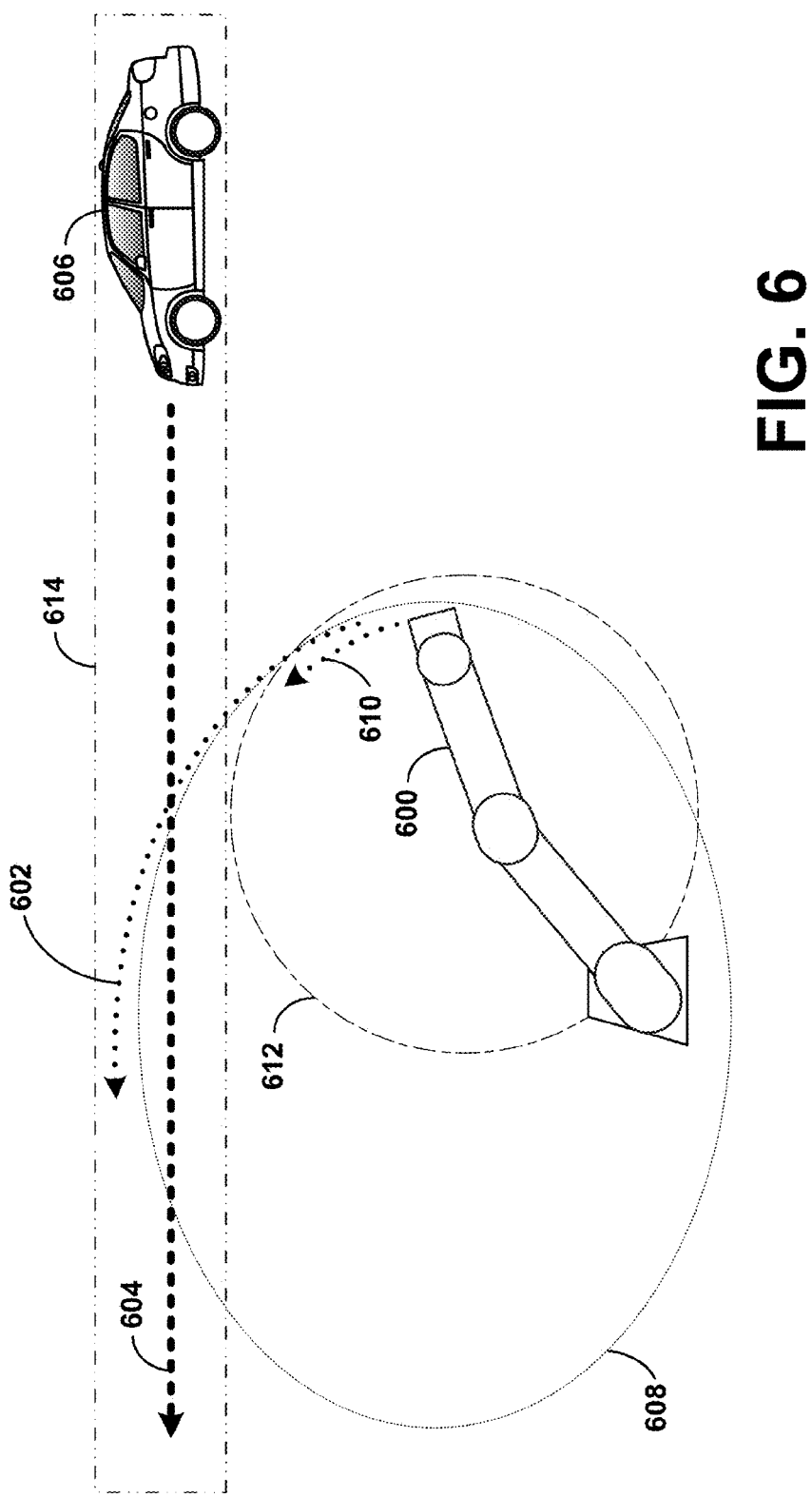
FIG. 6 illustrates example operations of the example method being performed, in accordance with at least some embodiments described herein.

FIG. 6 illustrates example operations of the example method being performed, in accordance with at least some embodiments described herein. In this example, a computing device (not shown) may determine that, in an upcoming predetermined period of time (e.g., one second), a robotic arm 600 of a robotic device may move along a trajectory 602 that will intersect with another trajectory 604 of a moving vehicle 606. At or before making this determination, one or more dimensions of the virtual safety cage 608 of the robotic arm 600 may be bounded in an ellipsoidal manner, as shown. However, upon making this determination, the computing device may adjust the trajectory of the robotic arm 600, where the adjusted trajectory 610 is such that the robotic arm 600 will come to an emergency stop at a location that does not intersect with the trajectory 604 of the moving vehicle 606. The computing device may also adjust the virtual safety cage accordingly, where the adjusted virtual safety cage 612 is bounded spherically in one or more dimensions, as shown. Furthermore, in some scenarios, the computing device may also determine a virtual safety cage 614 for the moving vehicle 606 and may determine the adjusted virtual safety cage 612 such that the adjusted virtual safety cage does not intersect with the moving vehicle's virtual safety cage.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a computing system, the method comprising:
    receiving, by one or more processors of the computing system, an instruction requesting that a robotic device perform, in an environment, a physical action involving a component of the robotic device;
    in response to receiving the instruction, the one or more processors determining multiple estimated trajectories of the component of the robotic device, wherein the multiple estimated trajectories are multiple trajectories along which the component is estimated to move in the environment as the robotic device performs the physical action;
    the one or more processors associating respective confidence scores to the robotic device moving along the multiple estimated trajectories;
    the one or more processors selecting, from the multiple estimated trajectories, a set of estimated trajectories having confidence scores that exceed a predetermined threshold;
    based on the selected set of estimated trajectories, the one or more processors determining a virtual safety cage representing a space that the robotic device is estimated to occupy in the environment while performing the physical action; and
    the one or more processors providing, into the environment, an indication of a location of the virtual safety cage.

2. The method of claim 1, wherein the indication visually depicts the selected set of estimated trajectories and the respective confidence scores associated to the selected set of estimated trajectories.

3. The method of claim 1, wherein providing the indication comprises causing a projecting device communicatively linked to the computing system to project, into the environment, a two-dimensional (2D) image of the virtual safety cage, wherein the 2D image depicts multiple 2D paths representative of the selected set of estimated trajectories.

4. The method of claim 1, wherein providing the indication comprises causing a projecting device communicatively linked to the computing system to project, into the environment, a three-dimensional (3D) indication of the virtual safety cage, and wherein the 3D indication depicts multiple 3D paths representative of the selected set of estimated trajectories.

5. The method of claim 1, wherein providing the indication comprises providing the indication to at least one computing device located remotely from the robotic device.

6. The method of claim 1, wherein the instruction requesting that the robotic device perform the physical action involving the component includes an instruction requesting that the robotic device use the component to move an object, and
    wherein the virtual safety cage further represents space that the object is estimated to occupy while the robotic device is moving the object.

7. The method of claim 1, further comprising:
    the one or more processors receiving, from one or more sensors of the computing system, data representative of a moving object detected in the environment; and
    based on the data, the one or more processors making a determination that the moving object is within a threshold distance of the virtual safety cage,
    wherein providing the indication comprises, responsive to the determination that the moving object is within the threshold distance of the virtual safety cage, causing a speaker in the environment to play a sound, wherein the speaker is communicatively linked to the computing system.

8. A method performed by a computing system, the method comprising:
    receiving, by one or more processors of the computing system, an instruction requesting that a robotic device perform, in an environment, a physical action involving a component of the robotic device;
    based on the instruction, the one or more processors determining an estimated trajectory of the component, wherein the estimated trajectory is a trajectory along which the component is estimated to move in the environment as the robotic device performs the physical action;
    based on the estimated trajectory of the component, the one or more processors determining a virtual safety cage representing a space that the robotic device is estimated to occupy in the environment while performing the physical action; and
    the one or more processors causing a projecting device communicatively linked to the computing system to project, into the environment, an indication of a location of a boundary of the virtual safety cage.

9. The method of claim 8, wherein the estimated trajectory is based on parameters of the component including one or more of: a maximum torque of the component, a maximum power output of the component, and a momentum of the component.

10. The method of claim 8, wherein the indication is a first indication, the method further comprising:
    the one or more processors identifying a moving object in the physical environment;

in response to identifying the moving object in the physical environment, determining an estimated trajectory of the moving object along which the moving object is estimated to travel;

making a comparison between the estimated trajectory of the moving object and the estimated trajectory of the component;

based on an output of the comparison, the one or more processors adjusting the estimated trajectory of the component;

based on the adjusted estimated trajectory of the component, the one or more processors adjusting the virtual safety cage; and the one or more processors causing the projecting device to project, into the environment, a second indication of a location of a boundary of the adjusted virtual safety cage.

11. The method of claim 10, wherein identifying the moving object in the physical environment comprises receiving, from one or more sensors communicatively linked to the computing system, data representative of the moving object detected in the environment, and wherein determining the estimated trajectory of the moving object along which the moving object is estimated to travel comprises:

based on the data, estimating a current velocity of the moving object and a current direction of the moving object; and based on the currently velocity and the current direction, determining the estimated trajectory of the moving object along which the moving object is estimated to travel.

12. The method of claim 10, wherein the moving object includes a human.

13. The method of claim 10, wherein the second indication includes a two-dimensional (2D) image of the adjusted virtual safety cage, wherein the 2D image depicts a 2D path representative of the adjusted estimated trajectory.

14. The method of claim 10, wherein the second indication includes a three-dimensional (3D) indication of the adjusted virtual safety cage, wherein the 3D indication depicts a 3D path representative of the adjusted estimated trajectory.

15. The method of claim 8, further comprising:

the one or more processors providing, to at least one computing device located remotely from the robotic device, the indication of the location of the boundary of the virtual safety cage.

16. A system comprising:
a robotic device;
one or more optical devices;
a wireless communication interface;
at least one processor; and
data storage comprising instructions executable by the at least one processor to cause the system to perform operations comprising:

receiving an instruction requesting that the robotic device perform, in an environment, a physical action involving a component of the robotic device;

in response to receiving the instruction, determining multiple estimated trajectories of the component of the robotic device, wherein the multiple estimated trajectories are multiple trajectories along which the component is estimated to move in the environment as the robotic device performs the physical action;

associating respective confidence scores to the robotic device moving along the multiple estimated trajectories;

selecting, from the multiple estimated trajectories, a set of estimated trajectories having confidence scores that exceed a predetermined threshold;

based on the selected set of estimated trajectories, determining a virtual safety cage representing a space that the robotic device is estimated to occupy in the environment while performing the physical action; and providing, into the environment, by one or more of the wireless communication interface and the one or more optical devices, an indication of a location of the virtual safety cage.

17. The system of claim 16, wherein the robotic device includes at least one robotic manipulator involved in performing the physical action, the operations further comprising:

determining respective ranges of motion for the at least one robotic manipulator, wherein determining the virtual safety cage is further based on the respective ranges of motion for the at least one robotic manipulator, and wherein the indication visually depicts the respective ranges of motion for the at least one robotic manipulator.

18. The system of claim 16, further comprising at least one computing device located remotely from the robotic device, wherein providing the indication comprises providing, by the wireless communication interface, the indication to the at least one computing device.

19. The system of claim 16, wherein providing the indication comprises providing, by the one or more optical devices, a three-dimensional (3D) indication of the virtual safety cage, and wherein the 3D indication depicts multiple 3D paths representative of the selected set of estimated trajectories.

20. The system of claim 16, wherein the instruction requesting that the robotic device perform the physical action involving the component includes an instruction requesting that the robotic device use the component to move an object, and wherein the virtual safety cage further represents space that the object is estimated to occupy while the robotic device is moving the object.

* * * * *